United States Patent
Kingston et al.

(10) Patent No.: US 8,083,634 B2
(45) Date of Patent: *Dec. 27, 2011

(54) DISK BRAKE, PLANET TRANSMISSION, DRIVE DEVICE AND WORK VEHICLE

(75) Inventors: Tim Kingston, Eskilstuna (SE); Mats Åkerblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 958 days.

This patent is subject to a terminal disclaimer.

(21) Appl. No.: 11/916,667

(22) PCT Filed: Jun. 27, 2005

(86) PCT No.: PCT/SE2005/001031

§ 371 (c)(1),
(2), (4) Date: Dec. 6, 2007

(87) PCT Pub. No.: WO2007/001220

PCT Pub. Date: Jan. 4, 2007

(65) Prior Publication Data

US 2011/0098150 A1    Apr. 28, 2011

(51) Int. Cl.
*F16H 3/44* (2006.01)
(52) U.S. Cl. ....................................................... 475/323
(58) Field of Classification Search .................. 475/323; 192/221.1
See application file for complete search history.

(56) References Cited

U.S. PATENT DOCUMENTS

| | | | |
|---|---|---|---|
| 3,703,224 A | 11/1972 | Bray | |
| 4,037,694 A | 7/1977 | Keese | |
| 4,051,930 A | 10/1977 | Masclet | |
| 4,624,353 A | 11/1986 | Sailer et al. | |
| 5,535,870 A | 7/1996 | Takezaki et al. | |
| 6,029,781 A | 2/2000 | Carrier | |
| 6,817,963 B1 * | 11/2004 | Solka | 475/323 |
| 7,402,120 B2 * | 7/2008 | Andersson et al. | 475/323 |
| 7,530,433 B2 * | 5/2009 | Kingston et al. | 188/71.5 |
| RE41,285 E * | 4/2010 | Kingston | 475/323 |
| 2008/0268998 A1 * | 10/2008 | Kingston et al. | 475/161 |

FOREIGN PATENT DOCUMENTS

GB    1595713 A    8/1981

OTHER PUBLICATIONS

International Search Report for corresponding International Application PCT/SE2005/001031, Jan. 23, 2006.
International Preliminary Report on Patentability for corresponding International Application PCT/SE2005/001031, Sep. 18, 2007.

* cited by examiner

*Primary Examiner* — Dirk Wright
(74) *Attorney, Agent, or Firm* — WRB-IP LLP

(57) ABSTRACT

A disk brake includes a set of brake disks, which includes a set of rotor disks and a set of stator disks, which are arranged so that every other brake disk includes a stator disk and every second disk includes a rotor disk. The brake disks are displaceable in relation to one another along a central axis for engagement and disengagement with one another. There is a layer of coating material on at least one of the sides of the stator disk for engagement with the adjacent rotor disk.

29 Claims, 4 Drawing Sheets

US 8,083,634 B2

DISK BRAKE, PLANET TRANSMISSION, DRIVE DEVICE AND WORK VEHICLE

BACKGROUND AND SUMMARY

An aspect of the present invention relates to a disk brake comprising a set of brake disks, which comprises a set of rotor disks and a set of stator disks, which are arranged so that every other brake disk consists of or comprises a stator disk and every second disk consists of or comprises a rotor disk, and which are displaceable in relation to one another along a central axis for engagement and disengagement with one another. An aspect of the invention further relates to a planetary transmission and a drive device for a wheel of a vehicle, the device comprising the planetary transmission.

An aspect of the invention relates primarily to the field of work machinery or work vehicles, such as wheel loaders, dumpers (frame-steered vehicles), back diggers (excavator loaders), and excavators.

The drive device therefore comprises the planetary transmission and forms a so-called final drive, or hub-mounted reduction gear. The wheel is then arranged rotationally locked on a hub and the planetary transmission is connected between a drive shaft and the hub. The drive shaft is driven by an angular gear, or center gear, which is in turn driven by the vehicle engine by way of a transmission system.

Arranging a planetary transmission on each drive wheel in this way produces a reduction in rotational speed from the drive shaft to the hub and an increase in torque from the drive shaft to the hub.

Rotationally locking a first set of brake disks to a planet carrier, as disclosed by WO 99/03699, for example, is already known. The brake disks are then connected via splines on a radially outer surface of the planet carrier.

WO 04/104436 describes a planetary transmission in which multiple planet wheel journals are joined by a bolted connection to a common, annular carrier, which has radially outer splines for the first set of brake disks.

It is desirable to provide a disk brake which affords a long service life and which is especially suited for rotationally locking the rotor disks to a journal of a planet carrier in a planetary gear train. In particular it is intended to address the problem of high surface pressures between the journal and the rotor disk.

According to an aspect of the invention, there is a layer of coating material on at least one of the sides of the stator disk for engagement with an adjacent rotor disk.

According to a preferred embodiment the rotor disk is devoid of a layer of coating material on its side. This serves to reduce the losses, so-called splash losses, which occur during the rotation of conventional rotor disks (which have a layer of coating material on both of their lateral surfaces) in an oil bath.

According to a preferred embodiment at least one of the rotor disks has a greater thickness than at least one of the stator disks. The rotating rotor disks are accordingly thicker so as on the one hand to absorb heat energy and on the other to produce a lower surface pressure between the disk and the journal.

The surface pressure between the disk and the journal can consequently be reduced without increasing the overall volume or cost of the brake.

Further advantageous embodiments of the invention are set forth in the following description, in the claims and in the drawings.

BRIEF DESCRIPTION OF THE DRAWINGS

The invention will be described in more detail below with reference to the embodiments shown in the drawings attached, in which.

DETAILED DESCRIPTION

Figure 1:
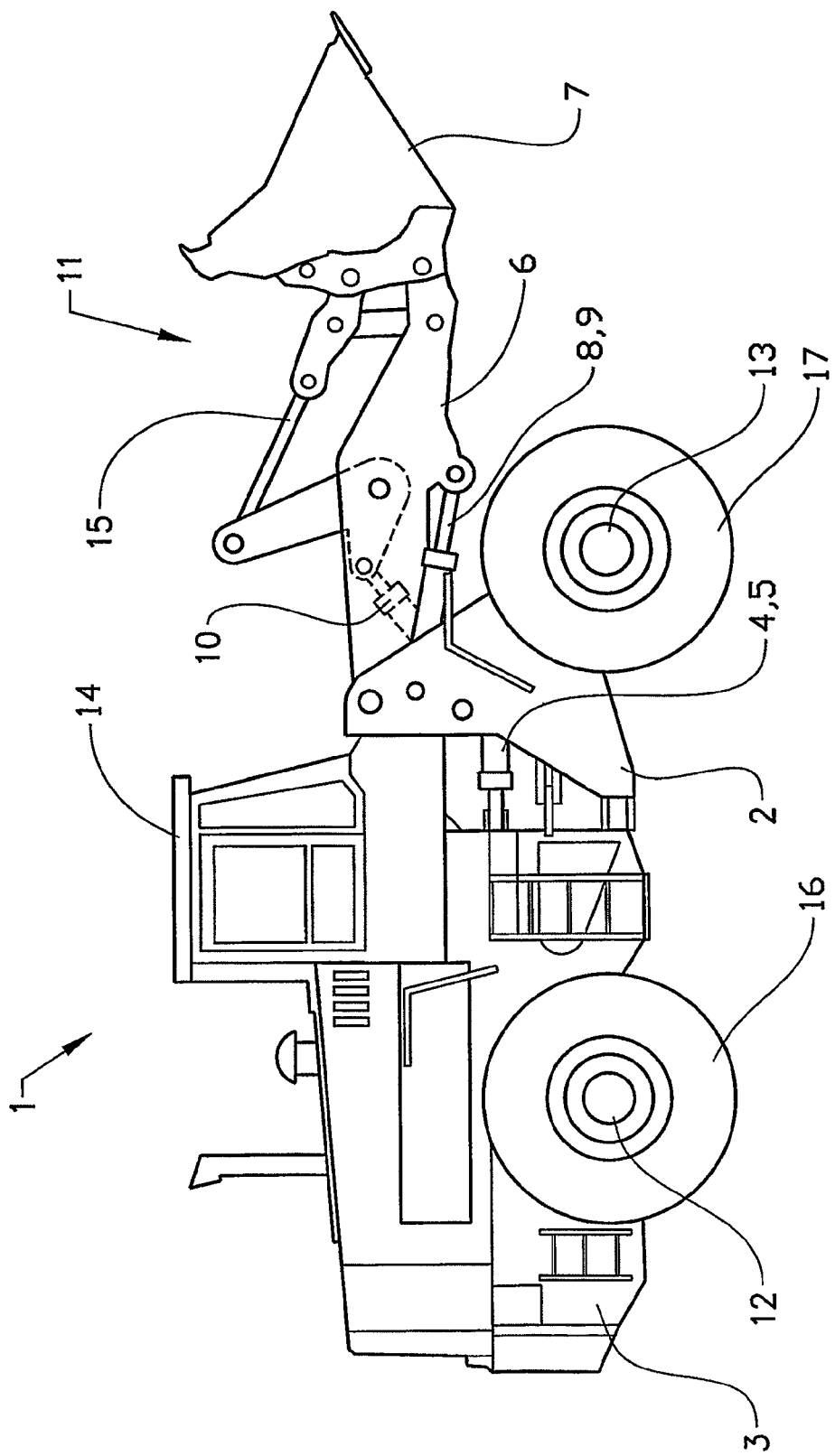
FIG. 1 shows a side view of a wheeled loader.

FIG. 1 shows a wheeled loader 1. The body of the wheeled loader 1 comprises a front section 2 and a rear section 3, which each have a pair of drive shafts 12, 13 with wheels 16, 17. The rear vehicle section 3 comprises a cab 14. The vehicle sections 2, 3 are arranged to rotate in relation to one another about a vertical axis with the aid of two first actuators in the form of hydraulic cylinders 4, 5 arranged between the two sections. The hydraulic cylinders 4, 5 are arranged on either side of a horizontal center line through the vehicle for the purpose of steering the vehicle.

The wheeled loader 1 comprises a device 11 for moving objects or material. The device 11 comprises a lifting arm unit 6 and an implement 7 in the form of a shovel, which is arranged on the load arm unit 6. A first end of the load arm unit 6 is rotatably connected to the front vehicle section 2. The implement 7 is rotatably connected to a second end of the load arm unit 6.

The load arm unit 6 can be raised and lowered in relation to the front section 2 of the vehicle by means of two other actuators in the form of two hydraulic cylinders 8, 9, which are each connected by one end to the front vehicle section 2 and by the other end to the load arm unit 6. The shovel 7 can be tilted in relation to the load arm unit 6 by means of a third actuator in the form of a hydraulic cylinder 10, which is connected by a first end to the front vehicle section 2 and by its second end to the shovel 7 via a linkage arm system 15.

Figure 2:
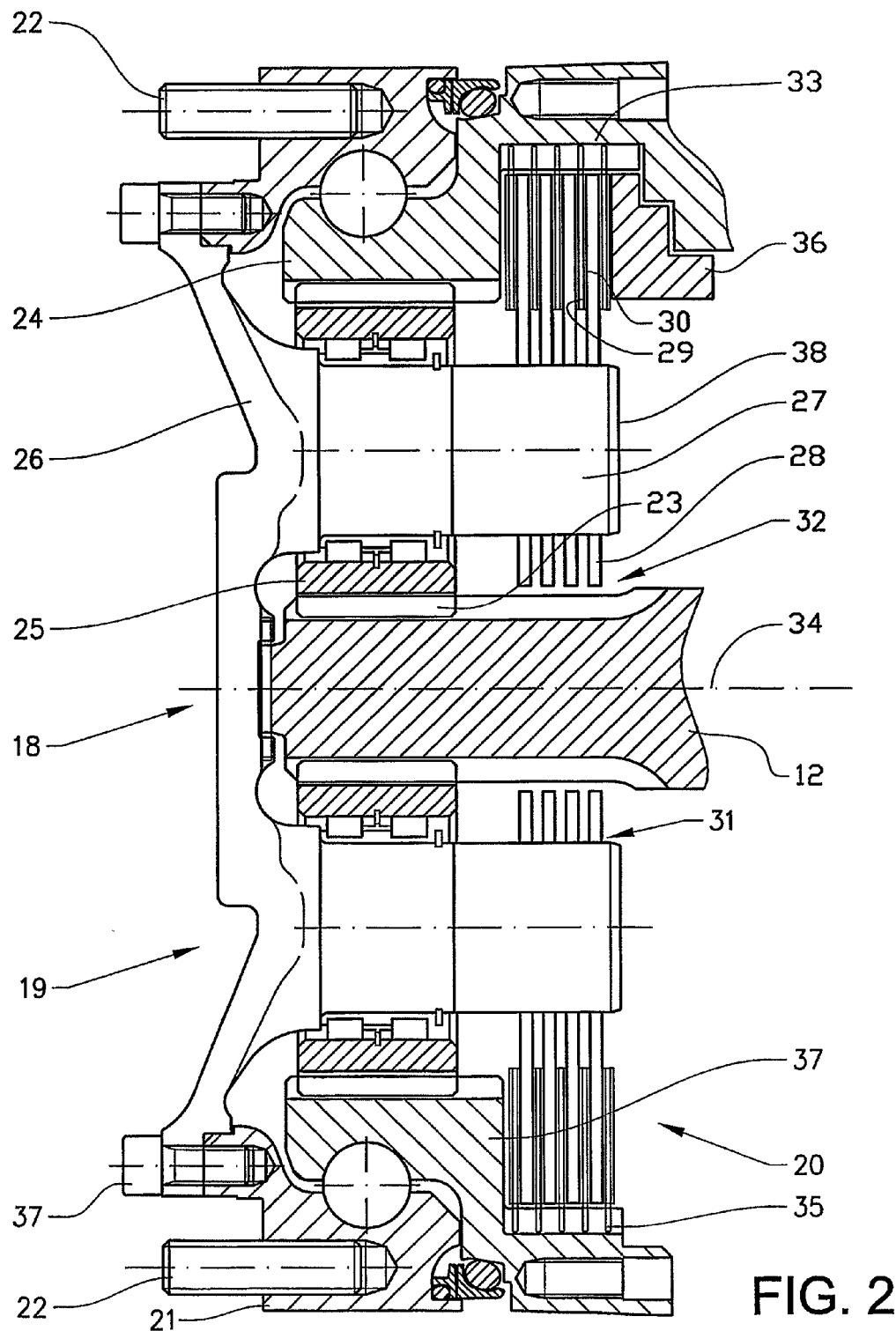
FIG. 2 shows a cut-away cross-sectional view of a planetary transmission with integral brake in a device for driving a wheel of a vehicle.

FIG. 2 shows a drive device 18 for driving one of the wheels 16, 17 of the wheeled loader. The drive device 18 comprises a planetary transmission 19 with an integral brake 20. The drive device 18 forms a so-called final drive, or hub-mounted reduction gear. The wheel 16, 17 is intended to be arranged rotationally locked on a hub 21 by means of wheel bolts 22. The planetary transmission 19 is connected between a drive shaft 12 and the hub 21. The drive shaft 12 is driven by an angular gear, or center gear, which is in turn driven by the vehicle engine by way of a transmission system (not shown).

The planetary transmission 19 comprises a sun gear 23 which is rotationally locked to the drive shaft 12 and which is arranged to drive the planetary transmission. The planetary transmission 19 further comprises a fixed ring gear 24 and multiple planet wheels 25 which are arranged between the sun gear 23 and the ring gear 24 and mesh with them.

Figure 3:
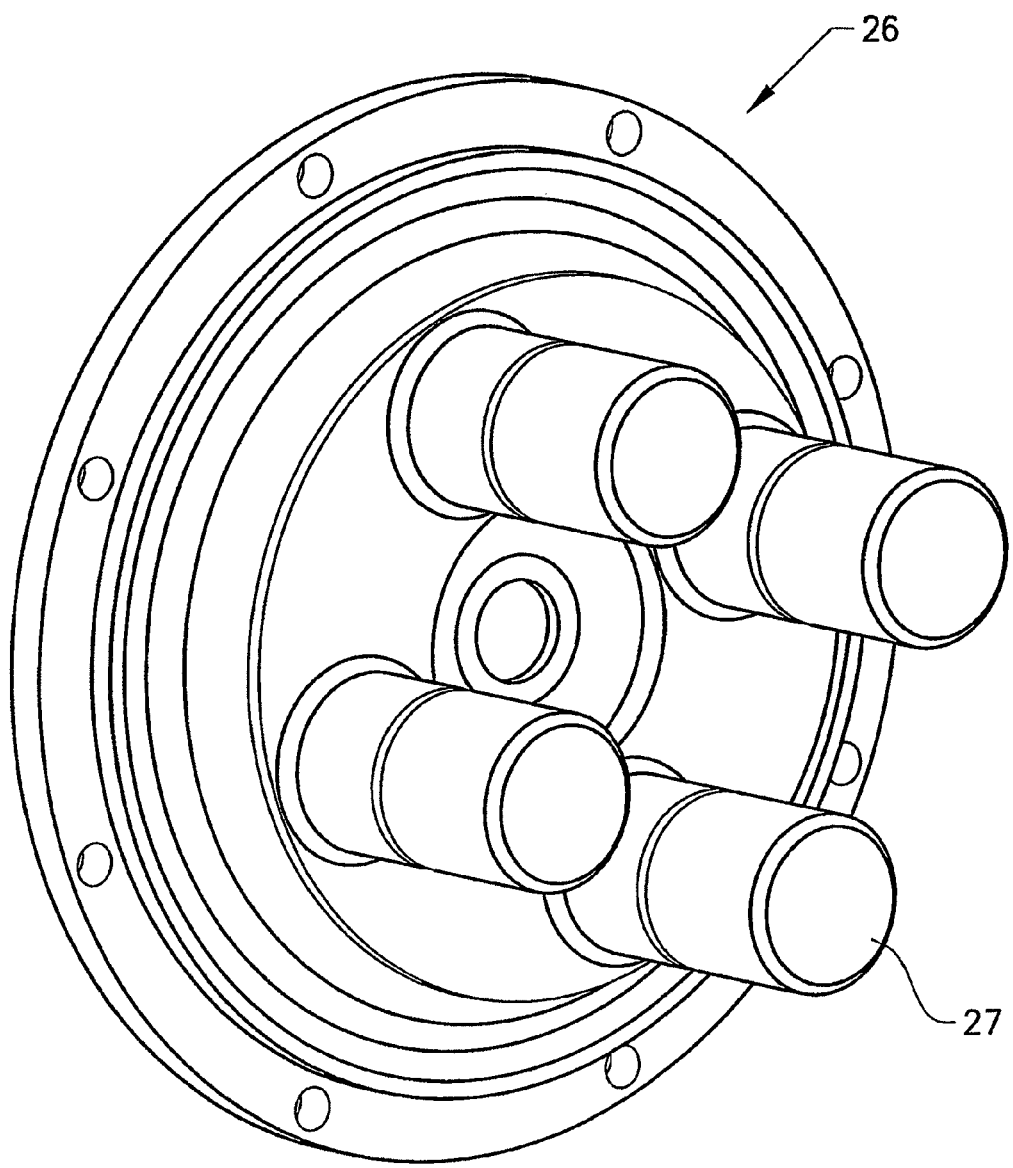
FIG. 3 shows a perspective view of a planet carrier forming part of the planetary transmission in FIG. 2.

The planetary transmission 19 further comprises a planet carrier 26 having multiple projecting journals 27, each for supporting one of said planet wheels 25. The planet carrier 26 comprises a rotationally symmetrical body, which is rotationally locked to the hub 21. The planet wheel journals 27 are here integrally formed with the body. The planet wheel journals 27 are arranged equidistant from one another in the circumferential direction of the planet carrier. In the exemplary embodiment shown the planet carrier 26 comprises four journals 27, see FIG. 3, but the number of journals may also be fewer or more than four.

The disk brake 20 of the planetary transmission 19 is a wet brake. The brake 20 comprises a set of brake disks, which comprises a set of rotor disks 28 and a set of stator disks 29. The term "rotor disks" relates to the disks which rotate in operation and the term "stator disks" relates to the disks which are fixed, that is to say non-rotating in operation. Every other brake disk consists of or comprises a stator disk and every second disk consists of or comprises a rotor disk. The brake disks are furthermore displaceable in relation to one another along a central axis 34 for engagement and disengagement with one another.

The stator and rotor disks 28, 29 are preferably of a metallic material, such as steel, preferably a normalized, low-ally carbon steel. Alternatively the stator disks and the rotor disks 28, 29 may be of some other material, such as plastics or carbon fibers.

There is a layer 30 of coating material on at least one of the sides of the stator disk for engagement with the adjacent rotor disk 28. There are preferably layers 30 of coating material on both sides of each of the stator disks 29. The rotor disks 28 on the other hand are devoid of layers of coating material on their sides. The coating material here is of paper, but it may alternatively be of some other material, such as plastics. The layer 30 of coating material preferably has a pattern, see FIG. 4, in order to permit a cooling flow between the stator disks and the rotor disks 28, 29 when the brake is activated.

The surface of the rotor disks 28 that is intended to come into contact with the layer of coating material 30 on the stator disks 29 when braking is preferably treated and has a certain surface fineness.

At least one of the rotor disks 28 has a greater thickness than at least one of the stator disks 29. All rotor disks 28 are preferably of one and the same type and all stator disks 29 preferably of one and the same type, and the rotor disks 28 have a greater thickness than the stator disks 29. Each of disks 28, 29 is preferably of a substantially constant thickness in a radial direction. The term "thickness" further relates to the thickness of the disk excluding the coating material. The rotor disks are preferably at least 1.5 times and suitably at least twice as thick as the stator disks. According to one exemplary embodiment the rotor disks are 5 mm thick and the stator disks 2 mm thick. The layer of coating material on the stator disks becomes worn in operation and its thickness is reduced, but according to one exemplary embodiment the thickness of each of the layers is 1.25 mm.

Figure 4:
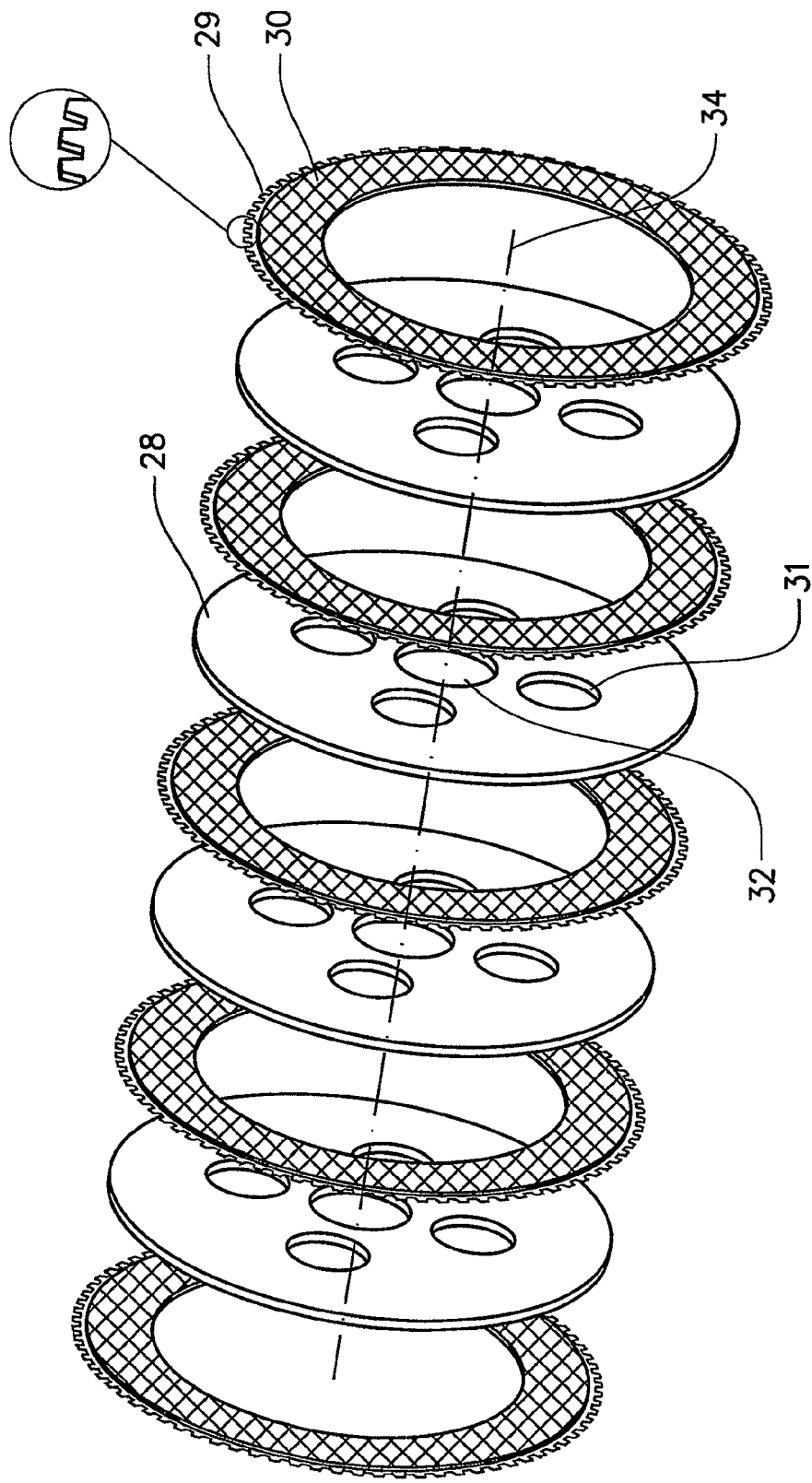
FIG. 4 shows an exploded view of a set of brake disks forming part of the brake in FIG. 2.

Each of the rotor disks 28 comprises at least one hole 31 for receiving said journal 27 of the planet carrier 26 for rotationally locked connection to the planet carrier, see also FIG. 4. According to the exemplary embodiment shown in FIG. 4 multiple holes 31 are arranged equidistant from one another in the circumferential direction of the rotor disk, each hole being intended to receive a planet carrier journal. Said holes 31 for the planet carrier journal 27 extend through the rotor disk.

The holes 31 are arranged equidistant from one another in the circumferential direction of the rotor disk 28. In the exemplary embodiment shown the rotor disk 28 comprises four holes 31, but the number of holes may also be fewer or more than four, according to the chosen number of planet wheel journals 27.

The holes 31 in the rotor disks 28 therefore match the planet wheel journals 27. The holes 31 suitably have a diameter somewhat larger than the outside diameter of the planet wheel journals 27.

Each of the rotor disks 28 comprises a central through-opening 32 for receiving the drive shaft 12. The central hole 32 has an inside diameter larger than the outside diameter of the drive shaft 12, so that the drive shaft can rotate at a greater speed than the rotor disks.

The rotor disks 28 are furthermore displaceable along the planet wheel journals 27 in the axial direction 34 of the planetary transmission. The stator disks 29 are arranged so that they are displaceable in the same direction in the housing 33, that is to say in a direction parallel to axis of rotation 34 of the planetary transmission. The housing 33 accordingly comprises radially inner means 35 for engagement with the stator disks 29, so that the rotation of the disks is counteracted and so that the brake disks can be displaced parallel to their central axis 34. This means of engagement 35 may comprise, for example, a toothed structure in the internal surface of the housing 33 and of a correspondingly shaped toothed structure on the radially outer surface of the brake disks 29, see FIG. 4.

The brake 2 comprises a brake piston 36, designed on activation to compress the brake disks 28, 29 against a counter-pressure plate 37. The counter-pressure plate 37 in this case forms part of the fixed housing 33.

The transmission of rotation and torque between the planet carrier 26 and the rotor disk 28 therefore occurs between the relatively long planet wheel journals 27 and the holes 31 in the rotor disks 28.

The fact that the planet carrier 26 is rotationally locked to the wheel hub 21 by a bolted connection 37 means that they rotate with the planet wheel journals 27 rotationally locked to the rotor disks 28 at the same speed as the wheel.

The brake disks 28, 29 are arranged closer to the free end 38 of the planet wheel journal than is the planet wheel 25.

The invention must not be regarded as being limited to the exemplary embodiments described above, a number of further variants and modifications being feasible without departing from the scope of the following claims.

The invention claimed is:

1. A planetary transmission comprising a planet carrier with at least one journal for supporting a planet wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk, and the set of rotor disks and the set of stator disks being displaceable in relation to one another along a central axis for engagement and disengagement with one another, wherein the rotor disks are rotationally locked to the planet carrier, wherein there is a layer of coating material on at least one side of the stator disk for engagement with the adjacent rotor disk wherein, the rotor disks comprise at least one hole, in which the planet carrier journal is received so that the rotor disks are rotationally locked directly to the planet wheel journal.

2. The planetary transmission as claimed in claim 1, wherein the planetary transmission comprises a sun gear, which is arranged to drive the planetary transmission, and a fixed ring gear, and the planet wheel is arranged between the sun gear and the ring gear and meshes with them.

3. A planetary transmission comprising a planet carrier with at least one journal for supporting a planet wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk, and the set of rotor disks and the set of stator disks being displaceable in relation to one another along a central axis for engagement and disengagement with one another, wherein the rotor disks are rotationally locked to the planet carrier, wherein there is a layer of coating material on at least one side of the stator disk for engagement with the adjacent rotor disk, wherein the brake disks are arranged closer to a free end of the planet carrier journal than is the planet wheel.

4. The planetary transmission as claimed in claim 1, wherein the adjacent rotor disk is devoid of a layer of coating material on its side which is adapted for engagement with the stator disk.

5. The planetary transmission as claimed in claim 1, wherein at least one of the rotor disks has a greater thickness than at least one of the stator disks.

6. The planetary transmission as claimed in claim 1, wherein all rotor disks are of the same type and all stator disks are of the same type, and that the rotor disks have a greater thickness than the stator disks.

7. The planetary transmission as claimed in claim 1, wherein the stator disks are of a metallic material.

8. The planetary transmission as claimed in claim 1, wherein the rotor disks are of a metallic material.

9. The planetary transmission as claimed in claim 7, wherein the metallic material is steel.

10. A planetary transmission comprising a planet carrier with at least one journal for supporting a planet wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk, and the set of rotor disks and the set of stator disks being displaceable in relation to one another along a central axis for engagement and disengagement with one another, wherein the rotor disks are rotationally locked to the planet carrier, wherein there is a layer of coating material on at least one side of the stator disk for engagement with the adjacent rotor disk, wherein each of the rotor disks comprises at least one hole for receiving a journal of a planet carrier for rotationally locked connection to the planet.

11. The planetary transmission as claimed in claim 10, wherein multiple holes are arranged equidistant from one another in the circumferential direction of the rotor disk, each hole being intended to receive a planet carrier journal.

12. The planetary transmission as claimed in claim 10, wherein the holes for the planet carrier journal extend through the rotor disk.

13. A planetary transmission comprising a planet carrier with at least one journal for supporting a planet wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk, and the set of rotor disks and the set of stator disks being displaceable in relation to one another along a central axis for engagement and disengagement with one another, wherein the rotor disks are rotationally locked to the planet carrier, wherein there is a layer of coating material on at least one side of the stator disk for engagement with the adjacent rotor disk, wherein each of the rotor disks comprises a central through-opening for receiving a drive shaft.

14. The planetary transmission as claimed in claim 13 wherein the central opening has an inside diameter larger than the outside diameter of the drive shaft.

15. A drive device in a wheel of a vehicle for transmitting a rotational movement from the vehicle engine to its wheel hub, wherein the drive device comprises a planetary transmission arranged on the wheel for reducing a speed between a transverse drive shaft and the vehicle wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk, and the set of rotor disks and the set of stator disks being displaceable in relation to one another along a central axis for engagement and disengagement with one another, wherein the rotor disks are rotationally locked to the wheel hub so that they rotate at the same speed as the wheel wherein there is a layer of coating material on at least one of the sides of the stator disk for engagement with the adjacent rotor disk, wherein the rotor disks are rotationally locked to the planet carrier.

16. The drive device as claimed in claim 15, wherein the rotor disks comprise at least one hole, in which the planet carrier journal is received so that the rotor disks are rotationally locked directly to the planet wheel journal.

17. The drive device as claimed in claim 16, wherein multiple holes are arranged equidistant from one another in a circumferential direction of the rotor disk, each hole being intended to receive a planet carrier journal.

18. The drive device as claimed in claim 16, wherein the holes for the planet carrier journal extend through the rotor disk.

19. The drive device as claimed in claim 15, wherein the planetary transmission comprises a sun gear, which is arranged to drive the planetary transmission, and a fixed ring gear, and that the planet wheel is arranged between the sun gear and the ring gear and meshes with them.

20. The drive device as claimed in claim 15, wherein the rotor disk is devoid of a layer of coating material on its side.

21. The drive device as claimed in claim 15, wherein at least one of the rotor disks has a greater thickness than at least one of the stator disks.

22. The drive device as claimed in claim 15, wherein all rotor disks are of the same type and all stator disks are of the same type, and that the rotor disks have a greater thickness than the stator disks.

23. The drive device as claimed in claim 15, wherein the stator disks are of a metallic material.

24. The drive device as claimed in claim 15, wherein the rotor disks are of a metallic material.

25. The drive device as claimed in claim 23, wherein the metallic material is steel.

26. A work vehicle comprising the drive device as claimed in claim 15.

27. A drive device in a wheel of a vehicle for transmitting a rotational movement from the vehicle engine to its wheel hub, wherein the drive device comprises a planetary transmission arranged on the wheel for reducing a speed between a transverse drive shaft and the vehicle wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk, and the set of rotor disks and the set of stator disks being displaceable in relation to one another along a central axis for engagement and disengagement with one another, wherein the rotor disks are rotationally locked to the wheel hub so that they rotate at the same speed as the wheel wherein there is a layer of coating material on at least one of the sides of the stator disk for engagement with the adjacent rotor disk, wherein the brake disks are arranged closer to the free end of the planet carrier journals than is the planet wheel.

28. A drive device in a wheel of a vehicle for transmitting a rotational movement from the vehicle engine to its wheel hub, wherein the drive device comprises a planetary transmission arranged on the wheel for reducing a speed between a transverse drive shaft and the vehicle wheel, and a disk brake comprising a set of brake disks, the set of brake disks comprising a set of rotor disks and a set of stator disks, the set of rotor disks and the set of stator disks being arranged so that every other brake disk comprises a stator disk and every second disk comprises a rotor disk and the set of rotor disks and the set of stator disks being displaceable in relation to one another along a central axis for engagement and disengagement with one another, wherein the rotor disks are rotationally locked to the wheel hub so that they rotate at the same speed as the wheel wherein there is a layer of coating material on at least one of the sides of the stator disk for engagement with the adjacent rotor disk, wherein each of the rotor disks comprises a central through-opening for receiving a drive shaft.

29. The drive device as claimed in claim 28, wherein the central opening has an inside diameter larger than the outside diameter of the drive shaft.

* * * * *